(12) United States Patent
Lange-Mao

(10) Patent No.: US 9,821,680 B2
(45) Date of Patent: Nov. 21, 2017

(54) METHOD FOR ADJUSTING A VEHICLE SEAT AND SYSTEM FOR ADJUSTING A VEHICLE SEAT

(71) Applicant: Johnson Controls GMBH, Burscheid (DE)

(72) Inventor: Wei Lange-Mao, Hagen (DE)

(73) Assignee: Johnson Controls GmbH, Burscheid (DE)

( * ) Notice: Subject to any disclaimer, the term of this patent is extended or adjusted under 35 U.S.C. 154(b) by 11 days.

(21) Appl. No.: 14/907,732

(22) PCT Filed: Jun. 23, 2014

(86) PCT No.: PCT/EP2014/063133
§ 371 (c)(1),
(2) Date: Mar. 16, 2016

(87) PCT Pub. No.: WO2015/010840
PCT Pub. Date: Jan. 29, 2015

(65) Prior Publication Data
US 2016/0221474 A1 Aug. 4, 2016

(30) Foreign Application Priority Data

Jul. 26, 2013 (DE) .......................... 10 2013 012 388

(51) Int. Cl.
*B60R 16/037* (2006.01)
*B60N 2/02* (2006.01)
*G08C 17/02* (2006.01)

(52) U.S. Cl.
CPC ......... *B60N 2/0228* (2013.01); *B60N 2/0232* (2013.01); *B60N 2/0248* (2013.01); *B60R 16/037* (2013.01); *G08C 17/02* (2013.01)

(58) Field of Classification Search
CPC .............. B60R 16/037; B60R 25/2081; B60R 2325/205; B60N 2/0228; B60N 2/0248;
(Continued)

(56) References Cited

U.S. PATENT DOCUMENTS 6,944,282 B1 * 9/2005 Pietruszka .......... H04M 1/2745
235/384
7,151,926 B2 * 12/2006 Prehofer ......... H04M 1/274516
455/414.1

(Continued)

FOREIGN PATENT DOCUMENTS

DE 102005026849 A1 12/2006
DE 102010005883 A1 7/2011
(Continued)

OTHER PUBLICATIONS

EPO machine translation of FR 2696384 (original FR document published Apr. 8, 1994).*
(Continued)

*Primary Examiner* — Behrang Badii
*Assistant Examiner* — David Testardi
(74) *Attorney, Agent, or Firm* — The Dobrusin Law Firm, P.C.

(57) ABSTRACT

A method and a system for adjusting a vehicle seat for a user of a vehicle, in particular for a motor vehicle, are proposed, wherein the vehicle seat is configured for electrical adjustment in accordance with at least one adjustment direction, wherein the vehicle seat and/or the vehicle have/has a control unit, wherein the control unit is assigned at least one antenna unit for wirelessly receiving information relating to the adjustment of the vehicle seat for the user, wherein the method for adjusting the vehicle seat comprises the following method steps: in a first method step, the vehicle seat is assigned a telecommunications appliance, in a second (Continued)

method step, information is input at the telecommunications appliance or information is stored in a memory device of the telecommunications appliance, in a third method step following the second method step, the information is wirelessly transmitted from the telecommunications appliance to the control unit of the vehicle seat or of the vehicle by means of radio transmission, in a fourth method step following the third method step, the vehicle seat is adjusted electrically.

10 Claims, 1 Drawing Sheet

(58) Field of Classification Search
CPC ... B60N 2/0232; G08C 2201/93; G08C 17/02
See application file for complete search history.

(56) References Cited

U.S. PATENT DOCUMENTS

| | | | | |
|---|---|---|---|---|
| 7,501,597 | B2 * | 3/2009 | Voltz | A47C 31/008 200/298 |
| 8,141,946 | B2 * | 3/2012 | Kramer | B64D 11/06 244/118.6 |
| 8,751,065 | B1 * | 6/2014 | Kato | H04M 1/72533 340/426.13 |
| 2003/0038221 | A1 * | 2/2003 | Fu | B60N 2/0228 248/421 |
| 2003/0114899 | A1 * | 6/2003 | Woods | A61N 1/36071 607/60 |
| 2006/0114101 | A1 * | 6/2006 | Schambeck | B60R 25/2081 340/5.61 |
| 2006/0181124 | A1 * | 8/2006 | Kish | B60N 2/0232 297/256.1 |
| 2007/0038345 | A1 * | 2/2007 | Heider | B60R 16/037 701/49 |
| 2007/0100514 | A1 * | 5/2007 | Park | B60R 25/00 701/2 |
| 2007/0265738 | A1 * | 11/2007 | Saito | B60N 2/0248 701/2 |
| 2008/0024296 | A1 | 1/2008 | Jeong | |
| 2008/0057929 | A1 * | 3/2008 | Min | G08C 17/02 455/418 |
| 2010/0318266 | A1 * | 12/2010 | Schaaf | B60K 35/00 701/49 |
| 2011/0210831 | A1 | 9/2011 | Talty et al. | |
| 2011/0214940 | A1 * | 9/2011 | Matharu | E06C 7/186 182/8 |
| 2011/0237186 | A1 * | 9/2011 | Preissinger | B60R 16/037 455/41.1 |
| 2012/0086249 | A1 * | 4/2012 | Hotary | B60N 2/0228 297/284.3 |
| 2012/0115446 | A1 * | 5/2012 | Gautama | G08C 17/02 455/414.1 |
| 2012/0158213 | A1 | 6/2012 | Talty et al. | |
| 2012/0208520 | A1 * | 8/2012 | Howarter | B60R 25/2009 455/420 |
| 2012/0303178 | A1 * | 11/2012 | Hendry | B60R 16/037 701/2 |
| 2012/0313751 | A1 * | 12/2012 | Kaelbling | B60N 2/0244 340/5.61 |
| 2013/0090816 | A1 * | 4/2013 | Huber | B60R 16/037 701/49 |
| 2013/0190947 | A1 * | 7/2013 | Jang | B60R 16/02 701/2 |
| 2016/0221474 | A1 | 8/2016 | Lange-Mao | |

FOREIGN PATENT DOCUMENTS

| | | | | | |
|---|---|---|---|---|---|
| EP | 1191486 | A1 | * | 3/2002 | ......... B60R 25/2081 |
| FR | 2696384 | A1 | * | 4/1994 | ........... B60N 2/0228 |
| GB | 2462113 | A | * | 1/2010 | ........... B60N 2/0248 |
| JP | 08126073 | A | * | 5/1996 | |
| JP | 2008053985 | A | * | 3/2008 | |
| JP | 2013112178 | A | * | 6/2013 | |
| WO | 2012/048100 | A2 | | 4/2012 | |

OTHER PUBLICATIONS

JPO machine translation of JP 2013-112178 (original JP document published Jun. 10, 2013).*
International Search Report and Written Opinion dated Sep. 25, 2014 (Application No. PCT/EP2014/063133).
German Examination Report dated Dec. 30, 2016, for German Application No. 102013012388.7.
Chinese Office Action for Chinese Application No. 201480051830.5 dated Dec. 29, 2016.
Korean Office Action for Korean Patent Application No. 10-2016-7005029, dated Mar. 29, 2017.
Japanese Office Action for Japanese Patent Application No. 2016-528384, dated Mar. 7, 2017.

* cited by examiner

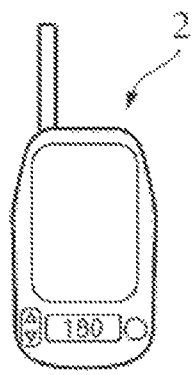
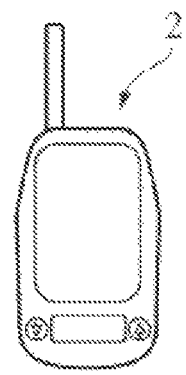
Fig. 1a    Fig. 1b
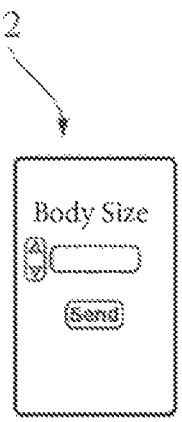
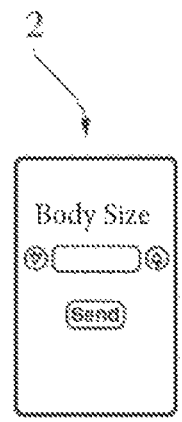
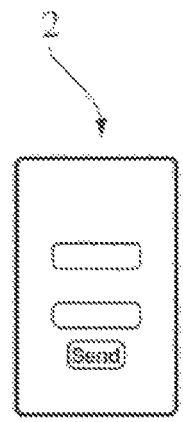
Fig. 1c    Fig. 1d    Fig. 1e
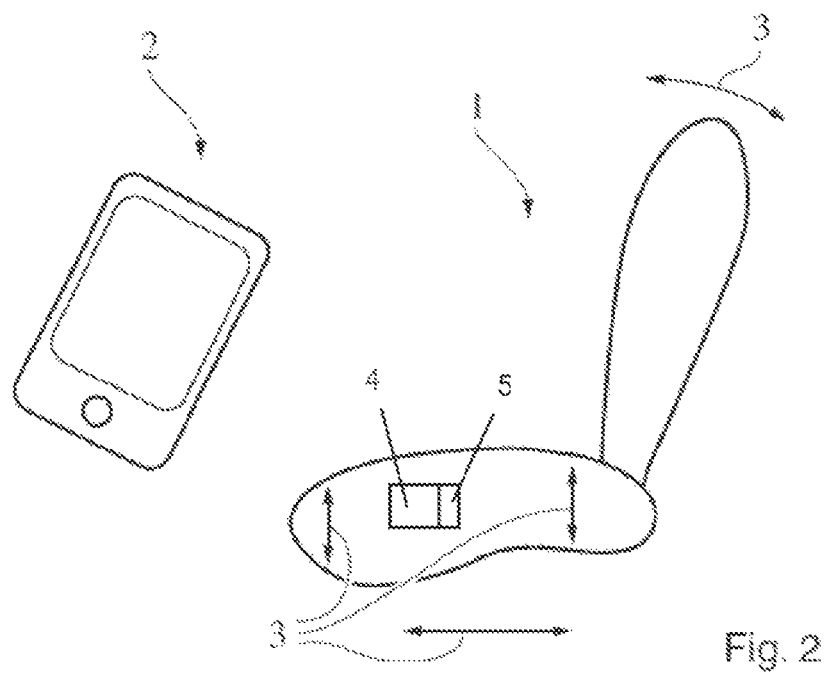
Fig. 2

METHOD FOR ADJUSTING A VEHICLE SEAT AND SYSTEM FOR ADJUSTING A VEHICLE SEAT

PRIOR ART

The present invention is based on a method for adjusting a vehicle seat and a system for adjusting a vehicle seat, in particular of a motor vehicle.

Methods for adjusting vehicle seats, in particular motor vehicle seats are generally known. It is thus by way of example known to provide an electrical drive for mechanically adjusting the vehicle seat so as to adjust a vehicle seat for a user of a vehicle.

A vehicle seat of this type is typically provided in such a manner that it can be adjusted in an electrical manner in accordance with at least one adjusting direction, preferably in accordance with a plurality of adjusting directions, with regard to its mechanism, in other words typically by means of electric motors or other actuators.

Vehicle seats having a plurality of adjusting directions are thus known, by way of example
 for adjusting the seat longitudinal position of the vehicle seat and/or
 for adjusting the seat height of the vehicle seat and/or
 for adjusting the seat incline (in other words the incline of the seating surface) of the vehicle seat and/or
 for adjusting the backrest incline of the vehicle seat and/or
 for adjusting the height position of the head support of the vehicle seat and/or
 for adjusting the longitudinal position of the head support of the vehicle seat and/or
 for adjusting the seat length (in other words the length or the supporting surface length of the seat surface) of the vehicle seat.

Normally, a vehicle seat of this type can be adjusted along one of two opposing adjustment directions, in other words by way of example for adjusting the seat longitudinal position of the vehicle seat both into a seat longitudinal position that is further forward (or is arranged more forward) (with respect to by way of example a centered seat longitudinal position) and can be adjusted into a seat longitudinal position that is more to the rear (or that is arranged further towards the rear) (with respect to the centered seat longitudinal position) so that generally a double adjustability is used for each adjustment direction.

Precisely such a multiple adjustability is encumbered by the fact that it is a complex procedure to adjust the seat position of the vehicle seat to precisely the position as desired by a user or to adjust the seat position of the vehicle seat in an appropriate manner to best suit the requirements of the user; or it is difficult to use the seat adjustment mechanism (typically by means of actuating devices that are provided on the vehicle—in other words generally arranged in the interior of the vehicle—) and/or that it is confusing or a user feels it is confusing or it can appear difficult to use said seat adjustment mechanism, which frequently means that the user does not change the seat position of the vehicle seat and continues to use a seat position of the vehicle seat that is not optimal or is not best adjusted to suit the requirements of the user and this is disadvantageous for the driving experience of the user of the vehicle seat—in particular with regard to the aspects of comfort.

DISCLOSURE OF THE INVENTION

It is therefore an object of the present invention to provide a method for adjusting a vehicle seat and a system for adjusting a vehicle seat, said system and method rendering it possible to achieve the correct or the optimal or the most comfortable seat position or the vehicle seat in a particularly simple, comfortable and not very confusing or difficult manner or in a manner that does not feel very confusing and that is comparatively simple and cost-effective to provide.

This object is achieved by means of a method for adjusting a vehicle seat for a user of a vehicle, in particular for a motor vehicle, wherein the vehicle seat is configured in accordance with at least one adjustment direction so as to perform the adjustment in an electrical manner, wherein the vehicle seat and/or the vehicle comprises a control unit, wherein the control unit is allocated at least one antenna unit for receiving in a wireless manner information that is related to adjusting the vehicle seat for the user, wherein the method for setting the vehicle seat includes the method steps:
 in a first method step, the vehicle seat is allocated a telecommunications device,
 in a second method step, information is input into the telecommunications device or information is stored in a storage device of the telecommunications device,
 in a third method step that follows the second method step, the information is transmitted from the telecommunications device to the control unit of the vehicle seat or the vehicle by means of a radio transmission in a wireless manner or by means of a wire-connected transmission means,
 in a fourth method step that follows the third method step the vehicle seat is adjusted in an electrical manner.

As a consequence, it is possible in a particularly simple manner—namely in particular by means of inputting merely a single piece of information that is related to the male user (or of course alternatively also to the female user, in the context of the present document, the grammatical term for male user is used, wherein this however is not to be seen as excluding female users) or also by means of inputting both the single piece of information as well as other information that is related to the user to achieve possibly as optimal as possible a seat adjustment so the user can use the vehicle seat.

The procedure of allocating the telecommunications device to the vehicle seat is by way of example a pairing step, such as the so-called "pairing" (in other words the process of first connecting two Bluetooth devices) when using Bluetooth radio connection technology for performing the wireless radio transmission between the telecommunications device on the one side and the control unit in the vehicle seat or in the vehicle on the other side. Alternatives to using Bluetooth radio communication technologies for performing the wireless radio transmission between the telecommunications device on one side and the control unit in the vehicle or in the vehicle on the other side include using a WLAN radio communication technology (Wireless Local Area Network) or other wireless transmission technologies or wireless radio transmission standards.

In an alternative to using a radio technology for transmitting the information from the telecommunications device to the control unit of the vehicle seat or the vehicle, the information can also be transmitted in a wire-connected manner, namely in particular by an input device that is arranged in the vehicle, by way of example in or on the center console of the vehicle. In this case, an input device of this type is used within the scope of the present invention and in particular within the scope of the method in accordance with the invention or rather the system in accordance with the invention as an alternative embodiment of the telecommunications device.

The telecommunications device is a bi-directional device, in other words the device also receives information such as for example the seat position for further processing the personalization of the seat.

Advantageous embodiments and further developments of the invention are evident in the dependent claims and also the description with reference to the drawings.

In accordance with the invention, it is in particular provided that the electrical adjustment of the vehicle seat that is performed in the fourth method step can be stopped or at least paused or interrupted by means of an emergency stop function. As a consequence, the level of safety with regard to a possible operating error (possibly by children) is improved.

In accordance with the invention, it is particularly preferred that the second method step is performed chronologically after the first method step, wherein the second method step in particular includes inputting information to the telecommunications device.

As a result of performing the second method step chronologically after the first method step, in particular information is input into the telecommunications device after allocating the telecommunications device to the vehicle seat.

In accordance with an alternative embodiment of the present invention, it is likewise possible and preferred in accordance with the invention that the second method step is preformed chronologically prior to the first method step, wherein the second method step in particular comprises storing information in the storage device of the telecommunications device.

As a consequence, it is in particular rendered possible to store the information in the telecommunications device chronologically prior to allocating the telecommunications device to the vehicle seat. In particular, the information can also be stored permanently in the storage device of the telecommunications device, by way of example by means of permanently saving the information in the telecommunications device that is embodied as a vehicle key or electronic vehicle key. However, in accordance with the invention it is likewise possible for the case of inputting information into the telecommunications device that inputting the information (in other words the second method step) occurs chronologically prior to the first method step, in other words allocating the telecommunications device to the vehicle seat.

In accordance with the invention, it is particularly preferred that information that is related to adjusting the vehicle seat for the user is information that is related to the body size of the user or that is related to the body proportions of the user or that is related to the preferred seat position type of the user, in particular said information corresponds to the body size of the user or the torso length of the user or a preferred comfort position or a preferred sport position. Within the scope of the present invention in the case of a user that is sitting upright on a (generally flat) seat surface, the term "torso length" of the user is to be understood to mean the measurement from the seat surface to the upper edge of the head of the user. In addition, as an alternative thereto, it is possible in accordance with the invention to also use information as to whether the user is a so-called seated dwarf or a so-called seated giant or a normally seated person. A "seated giant" is typically to be understood as the situation in which a person has a comparatively large (or long) upper body (from head to hip) and comparatively small (or short) legs, while the term "seated dwarf" is to be understood as the situation in which a person has a comparatively small (or short) upper body and comparatively large (or long) legs. In addition, within the scope of the present invention the term "preferred seat position type" is to be understood as the position that the user tends to prefer assuming, be it a rather more upright and/or lower seat position (sport position) or rather a less upright and/or higher seat position (comfort position).

As a consequence, it is possible in an advantageous manner to use information that is particularly easily accessible and in particular generally relatively reliably known regarding a user. In an alternative to using the body size or information that is related to the body size of the user, it is possible to use the weight of the user and/or the gender of the user and/or the age of the user.

In accordance with the invention, it is particularly preferred that the information that is related to the body size of the user or that is related to the body proportions of the user or that is related to the preferred seat position type is the sole user-specific information that is related to adjusting the vehicle seat for the user and that is transferred by means of the telecommunications device to the control unit of the vehicle seat or the vehicle.

As a consequence, it is possible in a particularly advantageous manner that it is not necessary to optically record the user by means of the telecommunications device in particular photographs of the user (or multiple photographs of the user) are not required.

In addition, it is preferably provided in accordance with the invention that in addition to the information that is related to the body site of the user—in particular during the second method step—further information is input into the telecommunications device or further information is stored in a storage device of the telecommunications device, wherein the further information is user-specific and is related to adjusting the vehicle seat for the user and is transmitted by means of the telecommunications device to the control unit of the vehicle seat or the vehicle.

As a consequence, in accordance with the invention it is possible in a particularly advantageous manner that further user-specific information is drawn upon for optimally adjusting the vehicle seat.

A further subject of the present invention relates to a system for adjusting a vehicle seat for a user of a vehicle, in particular for a motor vehicle, wherein the vehicle seat is configured in accordance with at least one adjusting direction for the electrical adjustment, wherein the system comprises the vehicle seat of the vehicle, wherein the vehicle seat and/or the vehicle comprises a control unit, wherein the control unit is allocated at least one antenna unit for receiving in a wireless manner information that is related to setting the vehicle seat for the user, wherein the system in addition comprises a telecommunications device that is at least temporarily allocated to the vehicle seat, wherein the telecommunications device is configured for inputting information or for storing information in a storage device of the telecommunications device, wherein the telecommunications device is in addition configured for radio transmitting the information in a wireless manner to the control unit of the vehicle seat or the vehicle, wherein the vehicle seat is configured in such a manner that the vehicle seat is electrically adjusted in dependence upon the information.

In accordance with the invention, it is in particular preferably provided that the system comprises an emergency stop means, wherein when activating the emergency stop means (in particular an emergency stop button), the electrical adjustment of the vehicle seat that is commencing or occurring can be stopped or at least paused or interrupted. As a consequence, the level of safety is improved with regard to a possible operating error (possibly by children).

In accordance with the invention it is in addition preferred that the information that is related to adjusting the vehicle seat for the user is information that is related to the body size of the user, in particular corresponding to the body size of the user.

Furthermore, it is likewise preferred in accordance with the invention that the information that is related to the body size of the user is the sole user-specific information that is related to adjusting the vehicle seat for the user and that is transmitted by means of the telecommunications device to the control unit of the vehicle seat or the vehicle.

In accordance with the invention it is also furthermore preferred that the telecommunications device is configured in such a manner that in addition to the information that is related to the body size of the user, further information is input into the telecommunications device or further information is stored in a storage device of the telecommunications device, wherein the telecommunications device is in addition configured in such a manner that the further information is user-specific and is related to adjusting the vehicle seat for the user and is transmitted by means of the telecommunications device to the control unit of the vehicle seat or the vehicle.

Further details, features and advantages of the invention are evident in the drawings and also the description hereinunder of preferred embodiments with reference to the drawings. The drawings illustrate merely exemplary embodiments of the invention that do not limit the fundamental inventive concept.

SHORT DESCRIPTION OF THE DRAWINGS

FIGS. 1a to 1e illustrate a schematic illustration of various possible alternatives of inputting the information that is related to adjusting the vehicle seat for the user.

FIG. 2 illustrated schematically a vehicle seat in accordance with the invention and a telecommunications device as a part of a system in accordance with the invention.

EMBODIMENTS OF THE INVENTION

Identical parts are always provided in the various figures with identical reference numerals and are therefore in general also in each case only named or mentioned once.

FIG. 1 illustrates schematically in the part FIGS. 1a, 1b, 1c, 1d and 1e in each case various possible alternatives to inputting into a telecommunications device the information that is related to adjusting the vehicle seat for the user. The part FIGS. 1a and 1b in each case illustrate the case of a telecommunications device in the form of an electronic vehicle key, wherein the electronic vehicle key comprises both a display unit as well as at least one preferably however a plurality of actuating elements. The part FIGS. 1c, 1d and 1e illustrate in each case the case of a telecommunications device in the form of a portable telecommunications transmitting device, in particular an intelligent telephone (smart phone), wherein the portable telecommunications transmitting device comprises both a display unit as well as at least one preferably however a plurality of actuating elements or however the actuating elements in the form of a touch-sensitive screen are integrated into the display unit (by means of so-called soft buttons).

It is possible by means of actuating the actuating elements for a user, to change by way of example the value of the body size of the user (by way of example illustrated in centimeters (cm)) that is displayed on the display unit (said change being performed by way of example by means of a first actuating element that is provided to increase the value of the body size of the user (so-called plus button), and by means of a second actuating element that is provided to lower the value of the body size of the user (so-called minus button)). By way of example by means of simultaneously actuating the two actuating elements (in particular simultaneously actuating the two actuating elements during a time interval that exceeds a specific predetermined duration or minimum actuation duration) the displayed value of the body size of the user is stored (in the storage device of the telecommunications device) and/or is transmitted in a wireless manner to the control unit of the vehicle seat or the vehicle by means of a radio transmission.

FIG. 2 illustrates schematically a vehicle seat in accordance with the invention 1 and a telecommunications device 2 as a part of a system in accordance with the invention. The telecommunications device 2 is allocated to the vehicle seat 1 in a first method step. In a second method step, the information is input into the telecommunications device 2 or the information is stored in a storage device of the telecommunications device 2. In a third method step that follows the second method step, the information is transmitted in a wireless manner from the telecommunications device 2 to the control unit 4, which includes the antenna unit 5 of the vehicle seat 1 or the vehicle by means of radio transmission. In a fourth method step that follows the third method step, the vehicle seat 1 is electrically adjusted. In accordance with the invention it is provided that the vehicle seat comprises a plurality of various adjusting directions 3, by way of example to adjust the seat longitudinal position of the vehicle seat and/or to adjust the seat height of the vehicle seat and/or to adjust the seat incline (in other words the incline of the seat surface) of the vehicle seat and/or to adjust the backrest incline of the vehicle seat and/or to adjust the height position of the head support of the vehicle seat and/or to adjust the longitudinal position of the head support of the vehicle seat and/or to adjust the seat length (in other words the length or the supporting surface length of the seat surface) of the vehicle seat. A plurality of various adjusting directions 3 of this type is illustrated schematically and in a merely exemplary manner in FIG. 2.

LIST OF REFERENCE NUMERALS

1 Vehicle seat
2 Telecommunications device
3 Adjustment direction

The invention claimed is:

1. A method for adjusting a vehicle seat for a user of a vehicle, wherein the vehicle seat is configured in accordance with at least one adjusting direction so as to be adjusted in an electrical manner,
   wherein the vehicle seat and/or the vehicle comprises a control unit, wherein the control unit includes at least one antenna unit for receiving in a wireless manner information that is related to adjusting the vehicle seat for the user,
   wherein the method for adjusting the vehicle seat includes the following method steps:
      in a first method step, a telecommunications device is paired to the vehicle seat,
      in a second method step, inputting information into the telecommunications device or storing information in a storage device of the telecommunications device,
      in a third method step that follows the second method step, transmitting the information by means of a radio transmission in a wireless manner from the telecommunications device to the control unit of the vehicle seat or the vehicle,
in a fourth method step that follows the third method step, adjusting the vehicle seat an electrical manner,
wherein the information that is related to adjusting the vehicle seat for the user is a value that is related to the body size of the user or the torso length of the user,
wherein the value is information that is user-specific that is related to adjusting the vehicle seat for the user and that is transmitted by means of the telecommunications device to the control unit of the vehicle seat or the vehicle,
wherein the telecommunications device comprises a first actuating element for increasing the value and a second actuating element for lowering the value, wherein, by means of simultaneously actuating the first and second actuating elements, the value is stored in the telecommunications device and/or is transmitted wirelessly to the control unit.

2. The method as claimed in claim 1, wherein the second method step is performed chronologically after the first method step, wherein the second method step in particular includes inputting the information to the telecommunications device.

3. The method as claimed in claim 1, wherein the second method step is performed chronologically prior to the first method step, wherein the second method step in particular comprises storing the information in the storage device of the telecommunications device.

4. The method as claimed in claim 3, wherein in addition to the information that is related to the body size of the user during the second method step further information is input into the telecommunications device or further information is stored in a storage device of the telecommunications device, wherein the further information is user-specific and is related to adjusting the vehicle seat for the user and is transmitted by means of the telecommunications device to the control unit of the vehicle seat or the vehicle.

5. The method as claimed in claim 3, wherein the information that is related to adjusting the vehicle seat for the user is information that is related to the body size of the user or torso length of the user or corresponds to a preferred comfort position or a preferred sport position.

6. The method as claimed in claim 1, wherein the vehicle is a motor vehicle.

7. A system for adjusting a vehicle seat for a user of a vehicle,
wherein the vehicle seat in accordance with at least one adjustment direction is configured so as to be adjusted in an electrical manner,
wherein the system comprises the vehicle seat of the vehicle,
wherein the vehicle seat and/or the vehicle comprises a control unit, wherein the control unit includes at least one antenna unit for receiving in a wireless manner information that is related to adjusting the vehicle seat for the user,
wherein the system in addition comprises at least one telecommunications device that is at least temporarily paired to the vehicle seat,
wherein the telecommunications device is configured so as to input information or to store information in a storage device of the telecommunications device,
wherein the telecommunications device is in addition configured for radio transmitting information in a wireless manner to the control unit of the vehicle seat or the vehicle,
wherein the vehicle seat is configured in such a manner that the vehicle seat is adjusted in an electrical manner in dependence upon the information,
wherein the information that is related to adjusting the vehicle seat for the user is a value that is related to the body size of the user or the torso length of the user,
wherein the value is information that is user-specific that is related to adjusting the vehicle seat for the user and that is transmitted by means of the telecommunications device to the control unit of the vehicle seat or the vehicle,
wherein the telecommunications device comprises a first actuating element for increasing the value and a second actuating element for lowering the value, and wherein, by means of simultaneously actuating the first and second actuating elements, the value is stored in the telecommunications device and/or is transmitted wirelessly to the control unit.

8. The system as claimed in claim 7, wherein the telecommunications device is a vehicle key of the vehicle or a portable telecommunications device.

9. The system as claimed in claim 8, wherein the portable telecommunications device is a smart phone.

10. The s tem as claim 7, wherein the vehicle is motor vehicle.

* * * * *

UNITED STATES PATENT AND TRADEMARK OFFICE
CERTIFICATE OF CORRECTION

| | |
|---|---|
| PATENT NO. | : 9,821,680 B2 |
| APPLICATION NO. | : 14/907732 |
| DATED | : November 21, 2017 |
| INVENTOR(S) | : Wei Lange-Mao |

It is certified that error appears in the above-identified patent and that said Letters Patent is hereby corrected as shown below:

In the Claims

Column 7, Line 4: insert --in-- after "seat"

Column 8, Line 45: delete "s stem" and replace with --system--

Column 8, Line 45: insert --a-- before "motor"

Signed and Sealed this
Fifth Day of June, 2018

Andrei Iancu
*Director of the United States Patent and Trademark Office*